(12) United States Patent
Fukushima et al.

(10) Patent No.: US 7,914,407 B2
(45) Date of Patent: Mar. 29, 2011

(54) BICYCLE FRONT DERAILLEUR ASSEMBLY

(75) Inventors: Yoji Fukushima, Osaka (JP); Nobuyoshi Fujii, Osaka (JP)

(73) Assignee: Shimano Inc., Osaka (JP)

( * ) Notice: Subject to any disclaimer, the term of this patent is extended or adjusted under 35 U.S.C. 154(b) by 669 days.

(21) Appl. No.: 11/754,475

(22) Filed: May 29, 2007

(65) Prior Publication Data

US 2008/0300076 A1 Dec. 4, 2008

(51) Int. Cl.
- *F16H 9/00* (2006.01)
- *F16H 59/00* (2006.01)
- *F16H 61/00* (2006.01)
- *F16H 63/00* (2006.01)

(52) U.S. Cl. ............................................ 474/82; 474/80
(58) Field of Classification Search ................ 474/80, 474/82
See application file for complete search history.

(56) References Cited

U.S. PATENT DOCUMENTS

| | | | | |
|---|---|---|---|---|
| 4,030,374 A | * | 6/1977 | Isobe | 474/82 |
| 4,279,605 A | * | 7/1981 | Egami | 474/82 |
| 4,362,522 A | * | 12/1982 | Huret | 474/82 |
| 4,424,048 A | * | 1/1984 | Shimano | 474/82 |
| 4,452,593 A | * | 6/1984 | Coue | 474/80 |
| 4,479,787 A | * | 10/1984 | Bonnard | 474/82 |
| 4,604,078 A | * | 8/1986 | Nagano | 474/80 |
| 4,617,006 A | * | 10/1986 | Nagano | 474/80 |
| 4,756,704 A | * | 7/1988 | Nagano | 474/144 |
| 5,037,355 A | * | 8/1991 | Kobayashi | 474/82 |
| 5,104,358 A | * | 4/1992 | Kobayashi | 474/82 |
| 5,312,301 A | * | 5/1994 | Kobayashi | 474/80 |
| 5,389,043 A | * | 2/1995 | Hsu | 474/80 |
| 5,496,222 A | * | 3/1996 | Kojima et al. | 474/80 |
| 5,620,384 A | * | 4/1997 | Kojima et al. | 474/82 |
| 5,624,336 A | * | 4/1997 | Kojima | 474/82 |
| 5,649,877 A | * | 7/1997 | Patterson | 474/80 |
| 5,779,580 A | * | 7/1998 | White et al. | 474/80 |
| 5,779,581 A | * | 7/1998 | Fujii | 474/82 |
| 5,816,966 A | * | 10/1998 | Yang et al. | 474/82 |
| 5,855,529 A | * | 1/1999 | Sugimoto | 474/80 |
| 5,857,932 A | * | 1/1999 | Sugimoto | 474/82 |
| 6,099,425 A | * | 8/2000 | Kondo | 474/82 |
| 6,135,905 A | * | 10/2000 | Soon | 474/82 |
| 6,146,298 A | * | 11/2000 | Nanko | 474/80 |
| 6,234,927 B1 | * | 5/2001 | Peng | 474/82 |
| 6,341,538 B1 | | 1/2002 | Takachi | 74/502.6 |

(Continued)

FOREIGN PATENT DOCUMENTS

EP 1 147 978 A2 10/2001

(Continued)

*Primary Examiner* — Michael R Mansen
*Assistant Examiner* — Henry Liu
(74) *Attorney, Agent, or Firm* — Global IP Counselors, LLP

(57) ABSTRACT

A manually operated bicycle front derailleur assembly includes a linkage assembly, a lever member and a connecting link. The linkage assembly is supported to a fixing member and includes an inner link pivotally coupled to the fixing member at a first pivot point, an extension arm extending from proximate the first pivot point, an outer link pivotally coupled to the fixing member at a second pivot point, and a chain guide pivotally coupled to the inner and outer links to move between an inner shift position and an outer shift position. The lever member is pivotally supported relative to the fixing member and the bicycle frame spaced apart from the first and second pivot points. The connecting link operatively connects the lever member to the extension arm such that the linkage assembly moves in response to movement of the lever member.

12 Claims, 14 Drawing Sheets

U.S. PATENT DOCUMENTS

| | | | |
|---|---|---|---|
| 6,471,610 B1 | 10/2002 | Tseng et al. | 474/80 |
| 6,491,597 B2 | 12/2002 | Chen | 474/82 |
| 6,629,903 B1 | 10/2003 | Kondo | 474/82 |
| 6,648,782 B2 | 11/2003 | Valle | |
| 6,695,729 B2 | 2/2004 | Ozaki | 474/80 |
| 6,899,649 B2 | 5/2005 | Ichida et al. | 474/70 |
| 6,923,740 B2 | 8/2005 | Nanko | 474/82 |
| 6,962,544 B2 | 11/2005 | Nanko | 474/80 |
| 7,014,584 B2 | 3/2006 | Nanko et al. | 474/80 |
| 7,081,058 B2 * | 7/2006 | Nankou | 474/80 |
| 7,186,194 B2 * | 3/2007 | Nankou | 474/80 |
| 7,189,173 B2 * | 3/2007 | Tsai et al. | 474/82 |
| 7,438,657 B2 * | 10/2008 | Nakai et al. | 474/80 |
| 7,438,658 B2 * | 10/2008 | Tetsuka et al. | 474/82 |
| 2002/0165054 A1 | 11/2002 | Chen | 474/82 |
| 2003/0083161 A1 | 5/2003 | Ozaki | 474/80 |
| 2003/0100393 A1 | 5/2003 | Nanko | 474/80 |
| 2004/0005951 A1 | 1/2004 | Tsai et al. | 474/80 |
| 2006/0189421 A1 | 8/2006 | Ichida et al. | |
| 2008/0300076 A1 * | 12/2008 | Fukushima et al. | 474/80 |

FOREIGN PATENT DOCUMENTS

| | | |
|---|---|---|
| EP | 1 433 696 A2 | 6/2004 |
| EP | 1 780 114 A2 | 5/2007 |

* cited by examiner

BICYCLE FRONT DERAILLEUR ASSEMBLY

BACKGROUND OF THE INVENTION

1. Field of the Invention

This invention generally relates to bicycle front derailleur assembly. More specifically, the present invention relates to a bicycle front derailleur assembly with a lever configuration that reduces tension applied to a shifting control cable.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle front derailleur assembly.

Typically in a bicycle front derailleur assembly, a control cable pulls on a linkage assembly member of the front derailleur in order to operate the front derailleur assembly. The front derailleur assembly typically includes a chain guide that is movable between at least two positions, such as an inner shift position and an outer shift position. Typically, the linkage assembly of the bicycle front derailleur includes a biasing member that biases the chain guide to move to one of the inner shift position and the outer shift position.

As the chain guide moves against the biasing force of the biasing spring, the force of the biasing spring typically increases. The increased biasing force from the biasing spring causes a corresponding increase in the tension acting on the control cable. Further, the increase tension on the control cable causes a corresponding increase in the force required to operate a gear shifting mechanism that controls movement of the front derailleur. Consequently, shifting the bicycle front derailleur assembly requires more force as the tension on the cable increases.

In view of the above, it will be apparent to those skilled in the art from this disclosure that there exists a need for an improved bicycle front derailleur that requires less force to operate when changing gear ratios. This invention addresses this need in the art as well as other needs, which will become apparent to those skilled in the art from this disclosure.

SUMMARY OF THE INVENTION

One object of the present invention is to provide a bicycle front derailleur that reduces the tension applied to a control cable by a biasing spring of the bicycle front derailleur.

The foregoing objects can basically be attained by providing a manually operated bicycle front derailleur assembly with a fixing member, a linkage assembly, a lever member and a connecting link. The fixing member is configured to be mounted to a bicycle frame. The linkage assembly is supported to the fixing member and includes an inner link, extension arm, an outer link and a chain guide. The inner link is pivotally coupled to the fixing member at a first pivot point. The extension arm extends from proximate the first pivot point and has a position adjustment member operable between the inner link and the extension arm. An outer link is pivotally coupled to the fixing member at a second pivot point. The chain guide is pivotally coupled to the inner and outer links to move between an inner shift position and an outer shift position. The lever member is pivotally supported relative to the fixing member and the bicycle frame spaced apart from the first and second pivot points. The connecting link operatively connects the lever member to a distal end of the extension arm such that the linkage assembly moves in response to movement of the lever member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
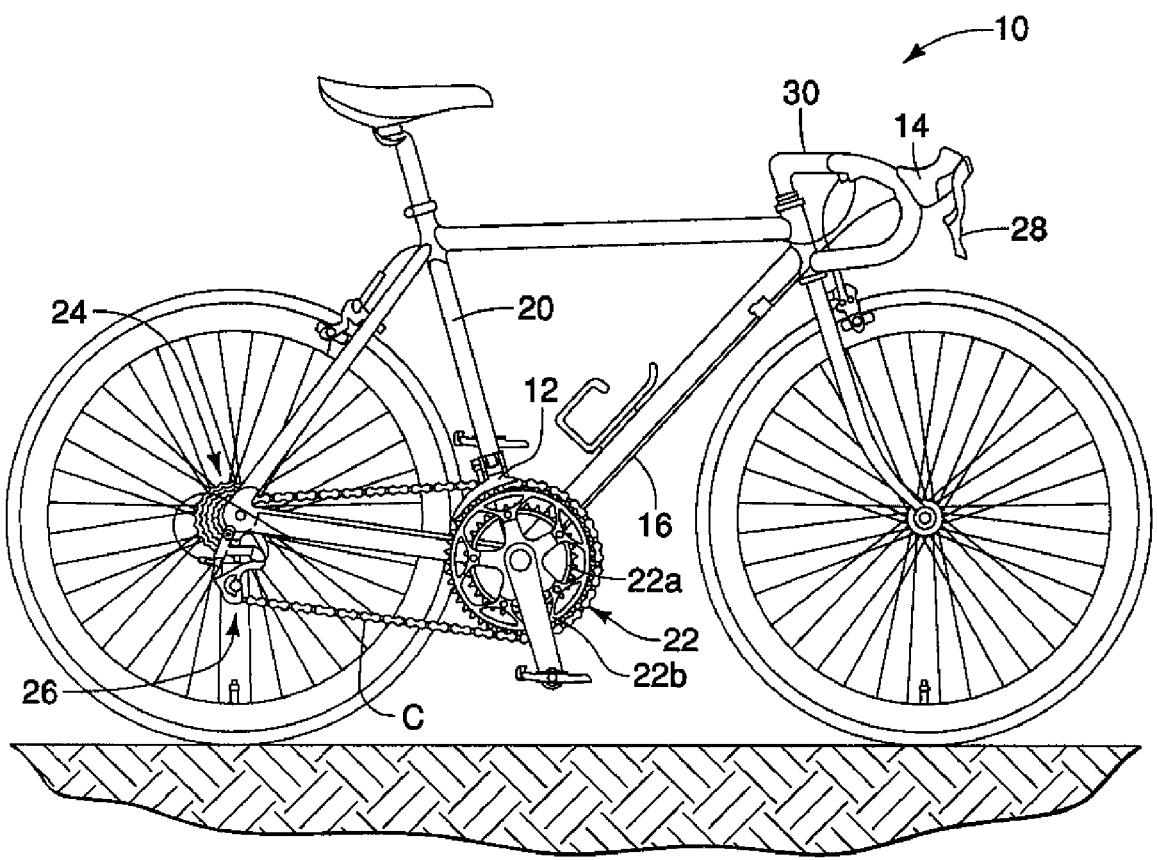
FIG. 1 is a side elevational view of a bicycle having a front derailleur in accordance with one embodiment of the present invention.

Referring initially to FIG. 1, a bicycle 10 is illustrated in accordance with a first embodiment of the present invention. The bicycle 10 includes a front derailleur 12 that changes the position of a chain C in response to movement of a gear shifting mechanism 14. The gear shifting mechanism 14 is configured to pull on a cable 16 that is operably connected to the front derailleur 12 in order to selectively position the front derailleur 12.

Figure 6:
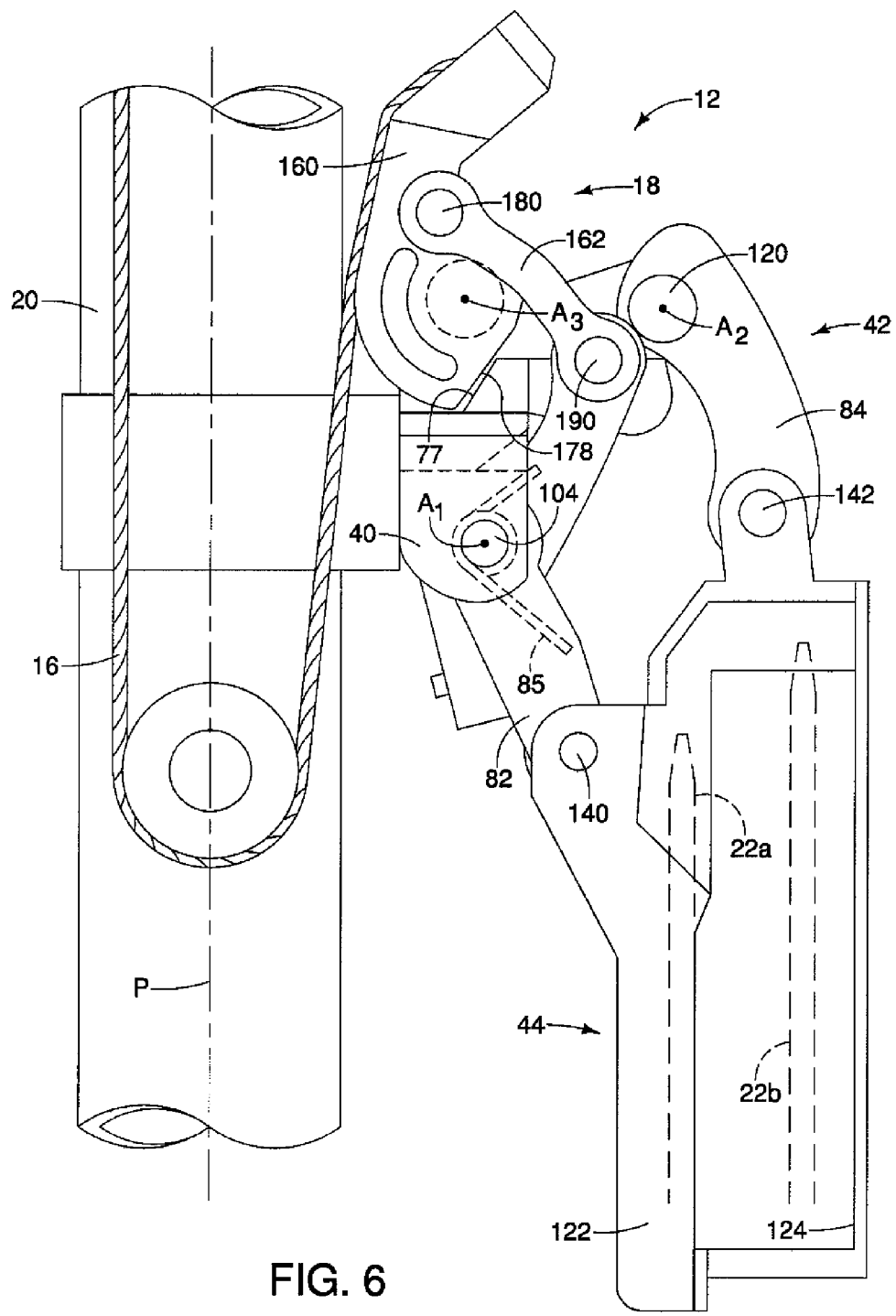
FIG. 6 is yet another rear elevational view of the portion of the bicycle showing the front derailleur with the chain guide in an outer shift position in accordance with one embodiment of the present invention.
Figure 7:
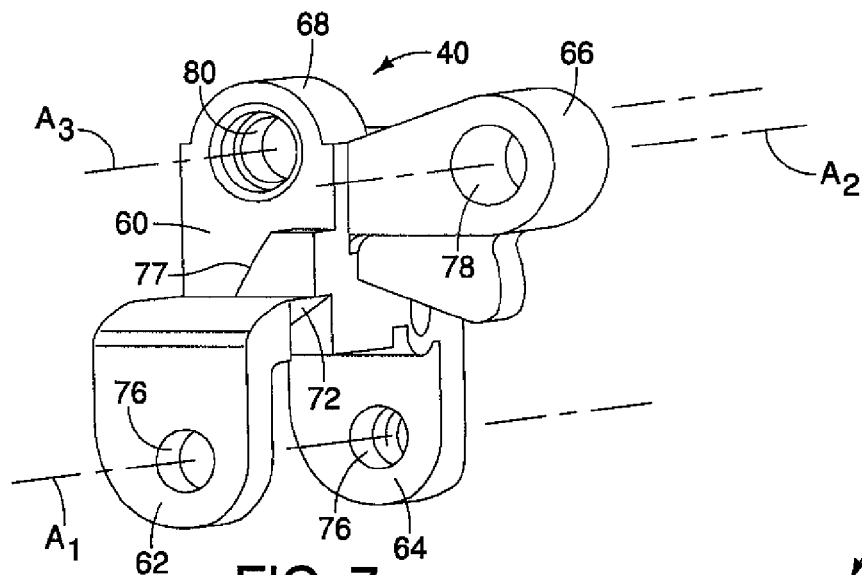
FIG. 7 is a perspective view of a fixing member shown removed from the front derailleur in accordance with one embodiment of the present invention.
Figure 9:
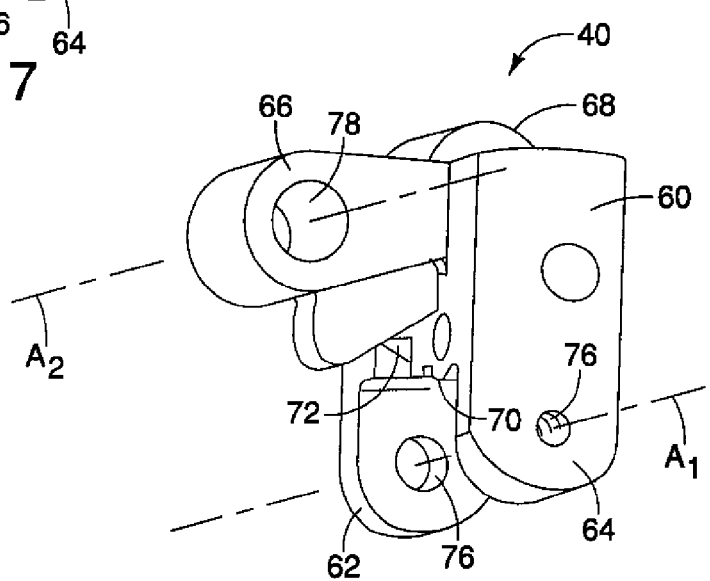
FIG. 9 is another perspective view of the fixing member from different angle showing the fixing member removed from the front derailleur in accordance with one embodiment of the present invention.
Figure 8:
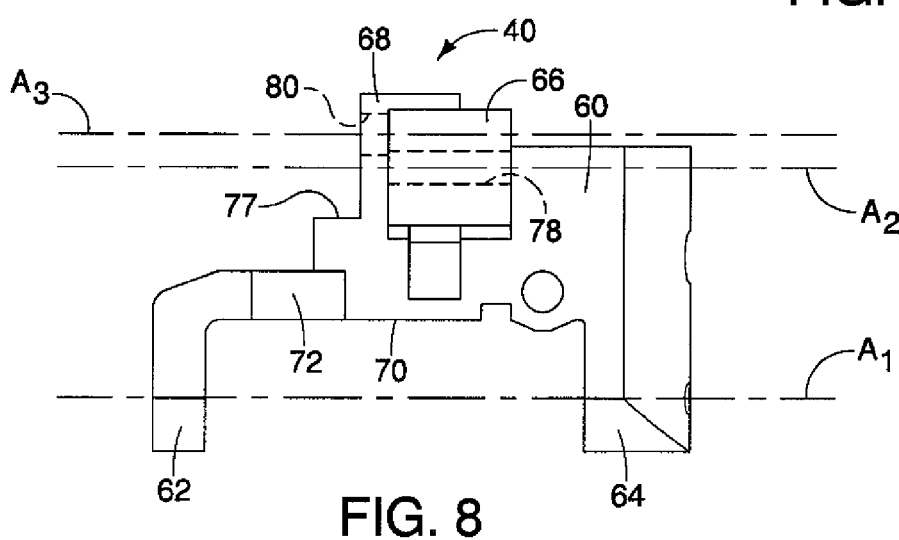
FIG. 8 is a side elevational view of the fixing member shown removed from the front derailleur in accordance with one embodiment of the present invention.

As described in greater detail below, biasing forces within the front derailleur 12 increase as the front derailleur 12 moves from an inner shift position (FIG. 4) to an outer shift position (FIG. 6). In a conventional front derailleur, increases in biasing force within a front derailleur cause a corresponding increase of the tension applied to a shifter cable by the front derailleur. However, the front derailleur 12 of the present invention is provided with a lever arrangement 18 (FIGS. 2 and 3) that kinematically prevents excessive increases in tension applied to the cable 16 by the front derailleur 12, as described in greater detail below.

As shown in FIG. 1, the bicycle 10 basically includes a frame 20, a front chainring set 22, a rear sprocket cassette 24, the chain C, a rear derailleur 26, a braking actuation mechanism 28, the gear shifting mechanism 14 and the front derailleur 12.

The frame 20 includes a handlebar 30 and other conventional elements whose description is omitted for the sake of brevity. The frame 20 defines a central plane P (see FIGS. 2 and 4-6) that extends through the longitudinal length of the bicycle 10. The plane P is generally vertically oriented with the bicycle 10 standing upright (and vertical). The gear shifting mechanism 14 and the braking actuation mechanism 28 are typically supported on the handlebar 30. However, it should be understood from the drawings and the description herein that the gear shifting mechanism 14 and/or the braking actuation mechanism 28 can be supported elsewhere on the frame 20.

As indicated in FIGS. 1 and 4-6, the front chainring set 22 includes, for example, two gear rings 22a and 22b. However it should be understood from the drawings and the description here in that the front chainring set 22 can alternatively include three gear rings or more, depending upon the overall configuration of the bicycle 10. The rear sprocket cassette 24, the chain C, the rear derailleur 26 and the gear shifting mechanism 14 are all conventional elements. Therefore description of these elements is omitted for the sake of brevity.

With specific reference to FIGS. 2-6, a description of the front derailleur 12 is now provided. The front derailleur 12 basically includes a base member or fixing member 40, a linkage assembly 42, a chain guide 44 and the lever arrangement 18.

The fixing member 40 is configured to be mounted to the frame 20 of the bicycle 10. In FIGS. 2 and 4-6 the fixing member 40 is shown with a clamping arrangement for attachment to the frame 20. A strap or clamping member is fastened by fasteners (not shown) to the fixing member 40 and clamped to the frame 20. However, various conventional attaching structures can be employed with the fixing member 40 for attaching the front derailleur 12 to the frame 20. For example, a bracket (not shown) can be fastened to the fixing member 40 and the frame 20 using threaded fasteners or rivets (not shown).

As shown best in FIGS. 7-10, the fixing member 40 basically includes a main body 60, a pair of projection 62 and 64 extending downwardly from the main body 60, a projection 66 extending laterally from the main body 60 and an upper portion 68.

Figure 10:
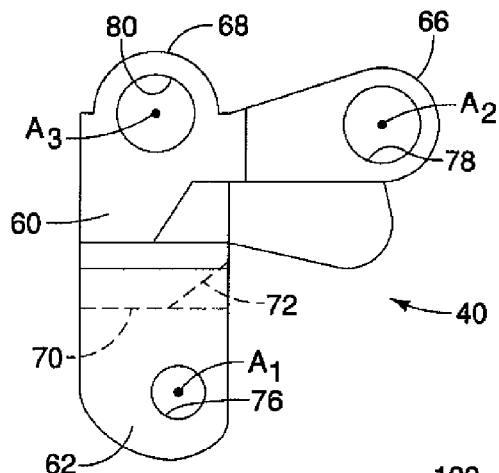
FIG. 10 is a rear elevational view of the fixing member shown removed from the front derailleur in accordance with one embodiment of the present invention.
Figure 11:
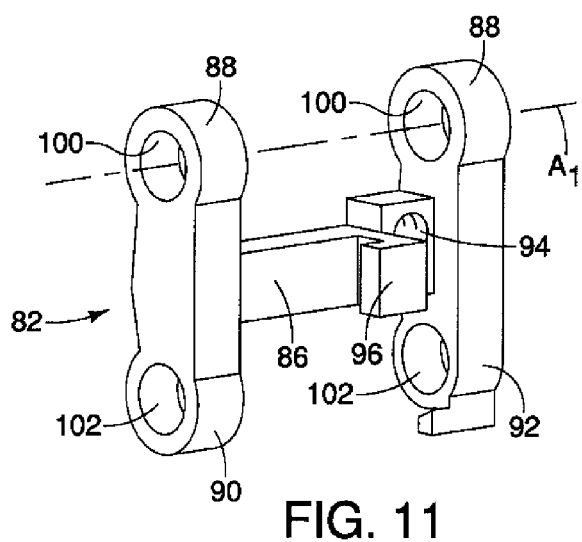
FIG. 11 is a perspective view of an inner link of the linkage assembly of the front derailleur shown removed from the front derailleur in accordance with one embodiment of the present invention.
Figure 12:
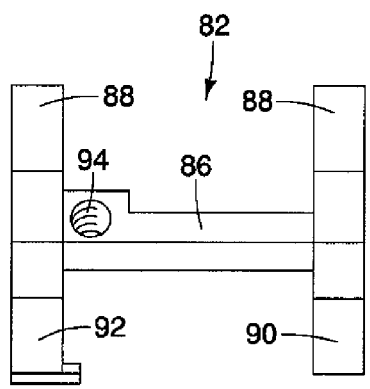
FIG. 12 is a side elevational view of the inner link of the linkage assembly of the front derailleur shown removed from the front derailleur in accordance with one embodiment of the present invention.
Figure 13:
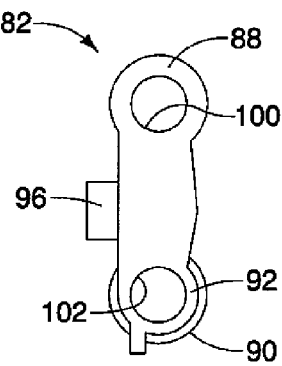
FIG. 13 is an rear elevational view of the inner link of the linkage assembly of the front derailleur shown removed from the front derailleur in accordance with one embodiment of the present invention.

The main body 60 includes a lower surface 70. A portion of the lower surface 70 is cut away and angled to form a ramped recess 72. The lower surface 70 extends between the projections 62 and 64. The recess 72 is dimensioned to provide clearance for a portion of the lever arrangement 18 and the linkage assembly 42, as described in greater detail below. The projections 62 and 64 are provided with co-axial bores 76 that define a first rotational axis A1. As indicated in FIG. 10, the first rotational axis A1 represents a first pivot point. The main body 60 also includes a projection that forms an abutment surface 77 located above the projection 62, as shown in FIGS. 2 and 4-8.

The projection 66 extends from the main body 60 approximately perpendicular to the projections 62 and 64. The projection 66 is provided with a bore 78 that defines a second rotational axis $A_2$. As indicated in FIG. 10, the second rotational axis $A_2$ represents a second pivot point.

The upper portion 68 includes a bore 80 that defines a fixed rotational axis $A_3$. As indicated in FIGS. 2 and 4-10, the first rotational axis $A_1$, the second rotational axis $A_2$ and the fixed rotational axis $A_3$ are preferably all parallel to one another.

Figure 4:
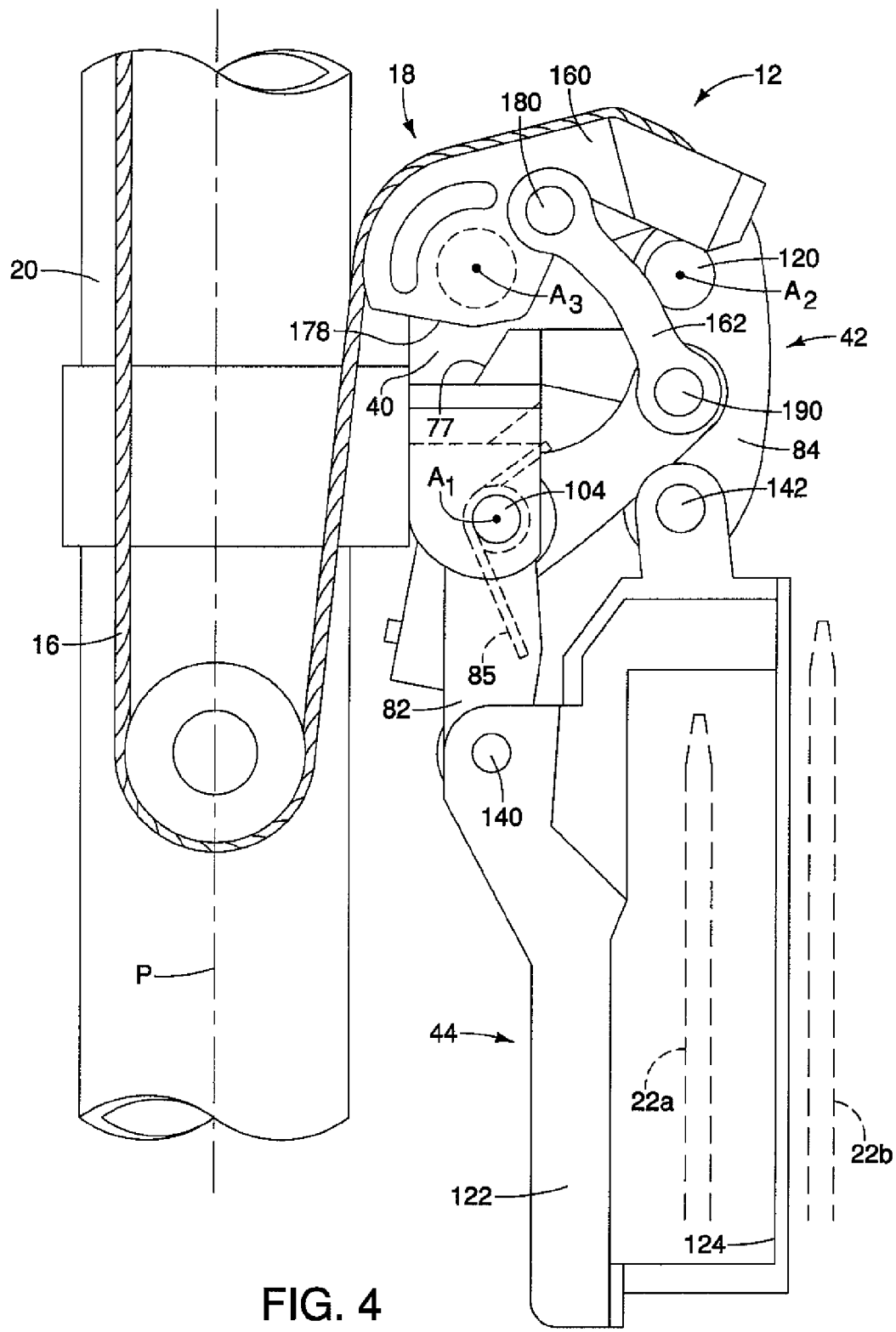
FIG. 4 is a rear elevational view of the portion of the bicycle showing the front derailleur with the chain guide in an inner shift position in accordance with one embodiment of the present invention.
Figure 5:
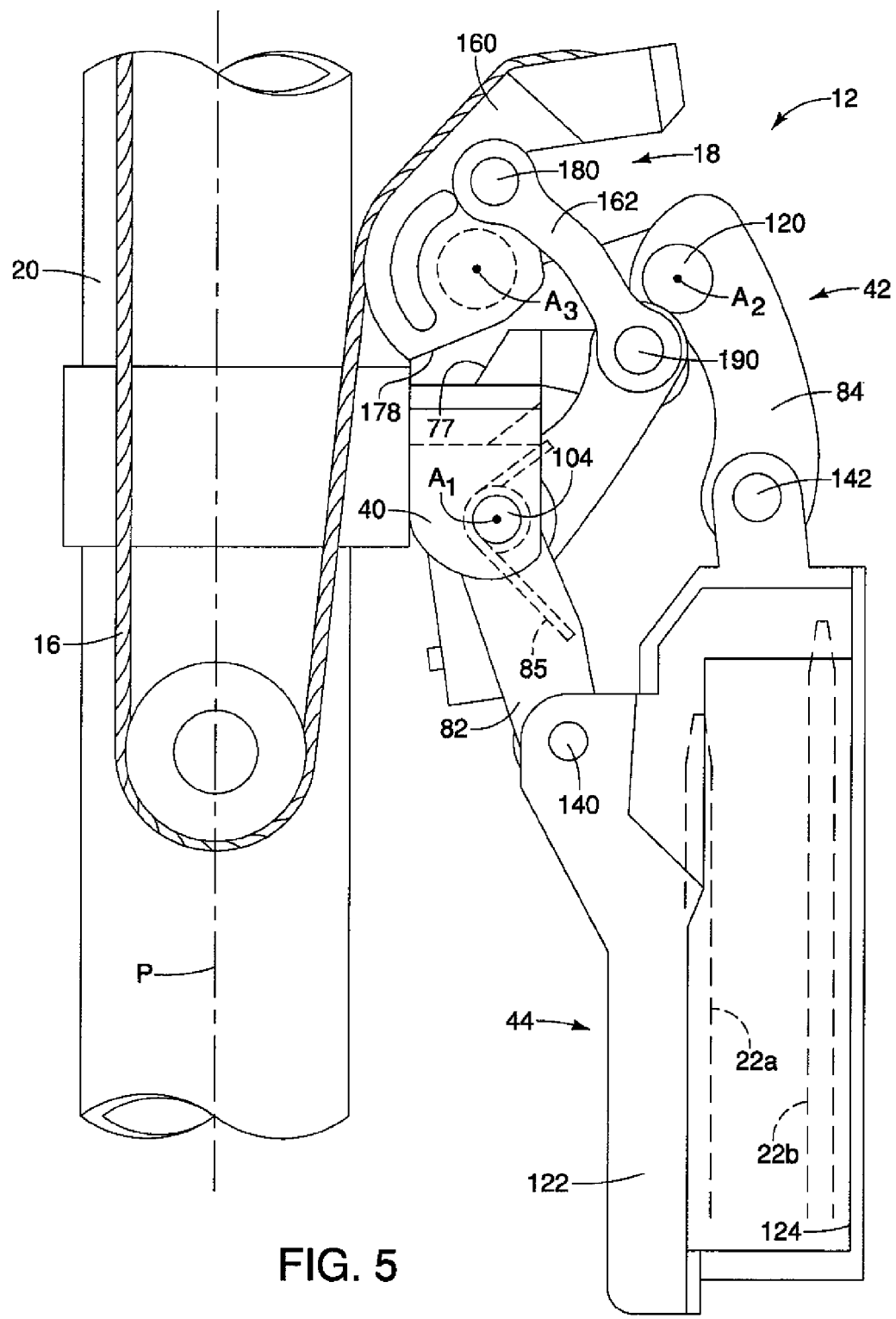
FIG. 5 is another rear elevational view of the portion of the bicycle showing the front derailleur with the chain guide in an intermediate shift position in accordance with one embodiment of the present invention.

As indicated in FIGS. 4-6, with the main body 60 fixed to the frame 20 of the bicycle 10, the fixed axis $A_3$ is located closer to the center plane P of the frame 20 than the second rotational axis $A_2$ (the second pivot point) and laterally closer to the center plane P of the frame 20 than the first rotational axis $A_1$ (the first pivot point). Further, the first rotational axis $A_1$ (the first pivot point) is closer to the center plane P of the frame 20 than the second rotational axis $A_2$ (the second pivot point). Also, the first rotational axis $A_1$ (the first pivot point) is located vertically lower than the fixed axis $A_3$ of the fixing member 40 relative to the bicycle frame 20.

As shown in FIGS. 2-6, the linkage assembly 42 includes an inner link 82, an outer link 84 and a biasing spring 85 (FIGS. 3-6 and 15).

As shown in FIGS. 11-13 and 15-16, the inner link 82 basically includes a central portion 86, two upper projections 88, a first lower projection 90 and a second lower projection 92. The central portion 86 includes a threaded bore 94 and a spring retaining portion 96. The threaded bore 94 is dimensioned to receive an adjusting screw 98 (shown in FIG. 15). The upper projections 88 include coaxially aligned bores 100. The first and second lower projections 90 and 92 include coaxial bores 102.

As shown in FIGS. 3-6, the inner link 82 is pivotally coupled to the fixing member 40 for movement about the first rotational axis $A_1$ (the first pivot point). More specifically, a pivot pin 104 (FIGS. 2-6) extends through the bores 76 of the projections 62 and 64 of the fixing member 40, and further extend through the bores 100 of the inner link 82. Hence, the inner link 82 pivots about the first rotational axis $A_1$ (the first pivot point).

Associated with the inner link 82 is an extension arm 106. The extension arm 106 is operably part of the inner link 82 and also operably part of the lever arrangement 18, described in greater detail below. A more detailed description of the extension arm 106 is provided below after a description of the outer link 84 and a description of the chain guide 44.

Figure 19:
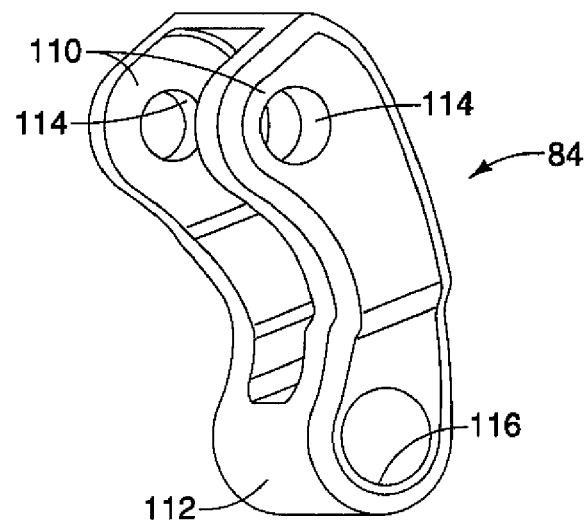
FIG. 19 is a perspective view of an outer link of the linkage assembly of the front derailleur shown removed from the front derailleur in accordance with one embodiment of the present invention.
Figure 20:
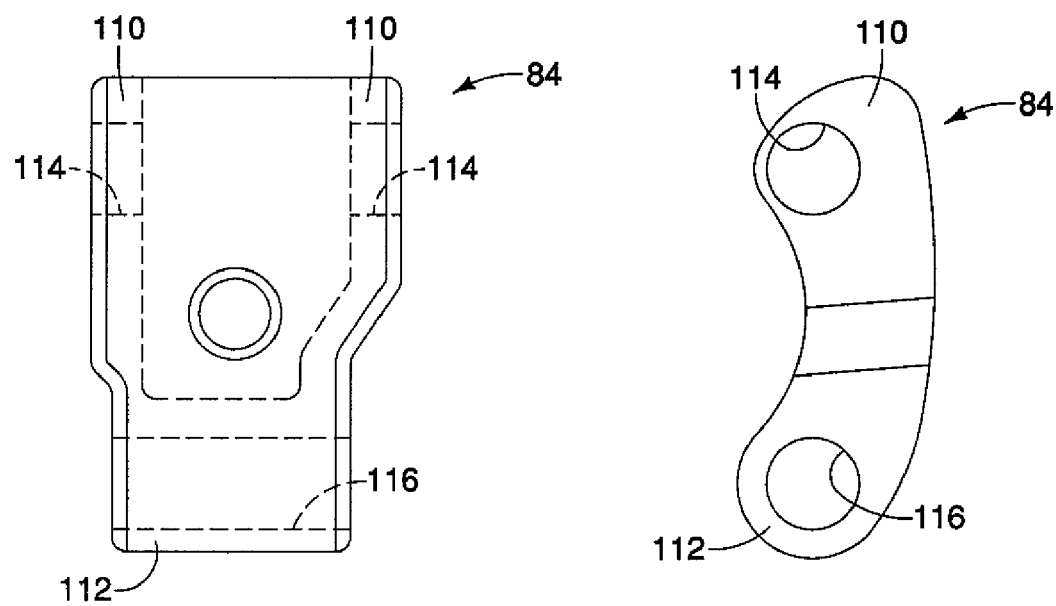
FIG. 20 is a side elevational view of the outer link of the linkage assembly of the front derailleur shown removed from the front derailleur in accordance with one embodiment of the present invention.
Figure 21:
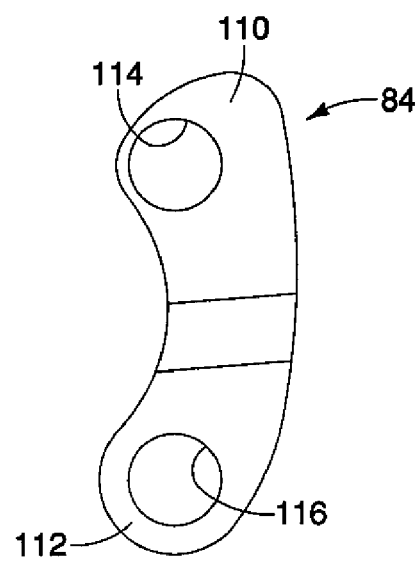
FIG. 21 is an rear elevational view of the outer link of the linkage assembly of the front derailleur shown removed from the front derailleur in accordance with one embodiment of the present invention.
Figure 22:
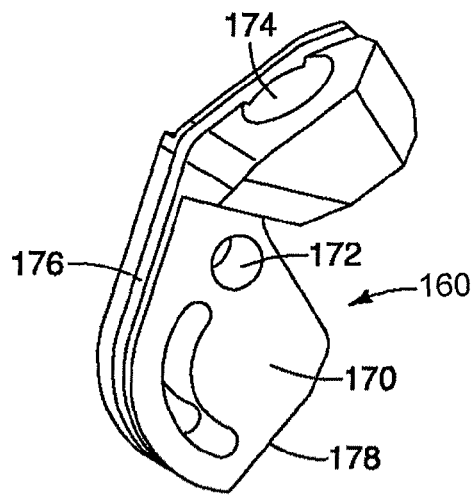
FIG. 22 is a perspective view of a lever member of the lever arrangement of the front derailleur shown removed from the front derailleur in accordance with one embodiment of the present invention.

As best shown in FIGS. 19-21, the outer link 84 basically includes a pair of projections 110 and a lower end 112. The pair of projections 110 include bores 114 that are co-axially aligned. The lower end 112 includes a bore 116. The bores 114 and the bore 116 extend in directions that are parallel to one another. The outer link 84 is pivotally coupled to the fixing member 40 such that the outer link 84 pivots about the second rotational axis $A_2$ (the second pivot point). More specifically, a pivot pin 120 (FIGS. 2-6) extends through the bores 78 of the projection 66 of the fixing member 40, and further extend through the bores 114 of the outer link 84. Hence, the outer link 84 pivots about the second rotational axis $A_2$ (the second pivot point).

As best shown in FIGS. 26-29, the chain guide 44 basically includes two elements: a moving part 122 and a cage part 124. The moving part 122 includes first attachment aperture 125, a second attachment aperture 126, a pair of first flanges 128 (only one shown in FIGS. 26 and 28, both shown in FIG. 3,) and a pair of second flanges 130. The first flanges 128 each include a coaxially aligned bore 132 and the second flanges 130 each include coaxially aligned bore 134.

Figure 29:
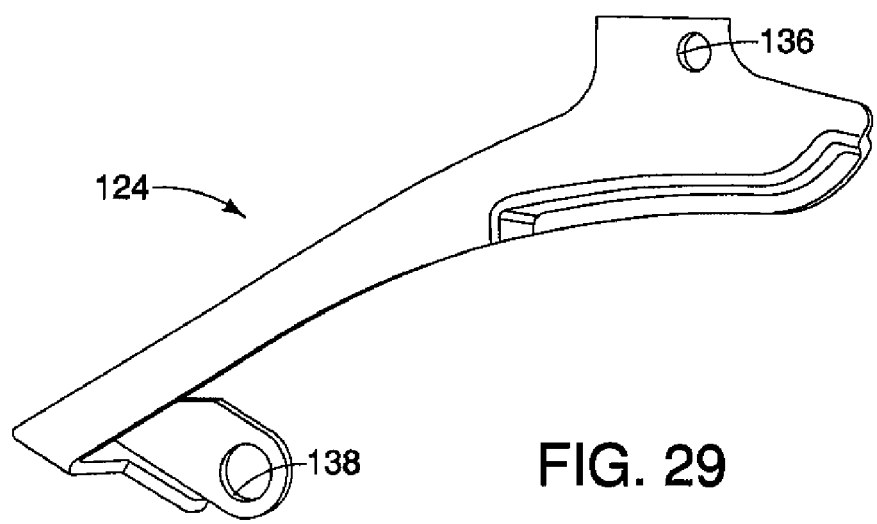
FIG. 29 is a perspective view of a cage part (a second portion) of the chain guide shown removed from the front derailleur in accordance with one embodiment of the present invention.

As best shown in FIG. 29, the cage part 124 is dimensioned to extend parallel to the moving part 122 and includes a third attachment aperture 136 and a fourth attachment aperture 138. The cage part 124 is fixed to the moving part 122 by fasteners (not shown) in a conventional manner. More specifically, the third attachment aperture 136 aligns with the first attachment aperture 125 of the moving part 122 and the fourth attachment aperture 138 aligns with the second attachment aperture 126 such that the cage part 124 and the moving part 122 are attached to one another to form the chain guide 44.

The chain guide 44 is pivotally attached to the inner and outer links 82 and 84. Specifically as indicated in FIGS. 3-6, pivot pins 140 extend through respective bores 102 of the inner link 82 and bores 132 of the first flanges 128 of the moving part 122 of the chain guide 44. Further as shown in FIGS. 2 and 4-6, pivot pin 142 extends through the bores 134 of the second flanges 130 and the bore 116 of the lower end 112 of the outer link 84. Hence, the chain guide 44 moves between the inner shift position shown in FIG. 4, an intermediate position shown in FIG. 5 and the outer shift position shown in FIG. 6 in response to movement of the linkage assembly 42.

Figure 14:
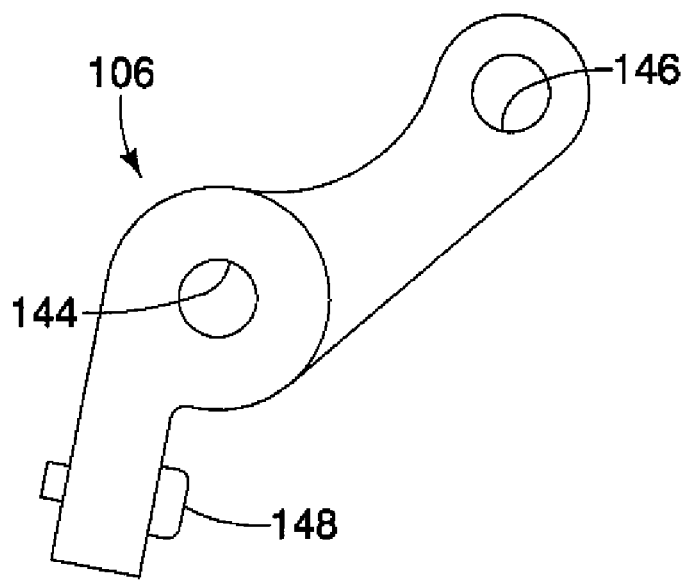
FIG. 14 is an rear elevational view of an extension arm of the inner link of the linkage assembly of the front derailleur shown removed from the front derailleur in accordance with one embodiment of the present invention.
Figure 15:
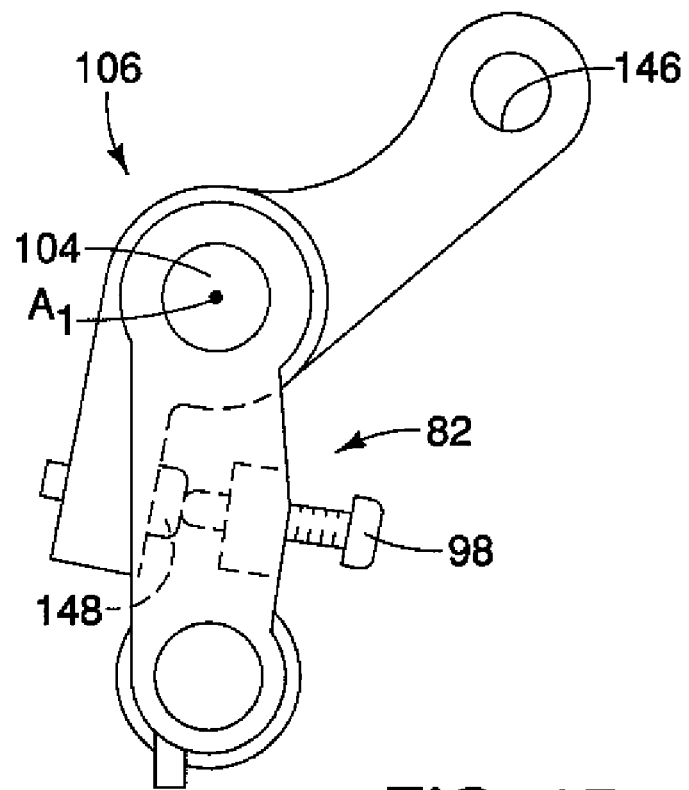
FIG. 15 is an rear elevational view of the extension arm and the inner link of the linkage assembly of the front derailleur shown removed from the front derailleur in accordance with one embodiment of the present invention.
Figure 16:
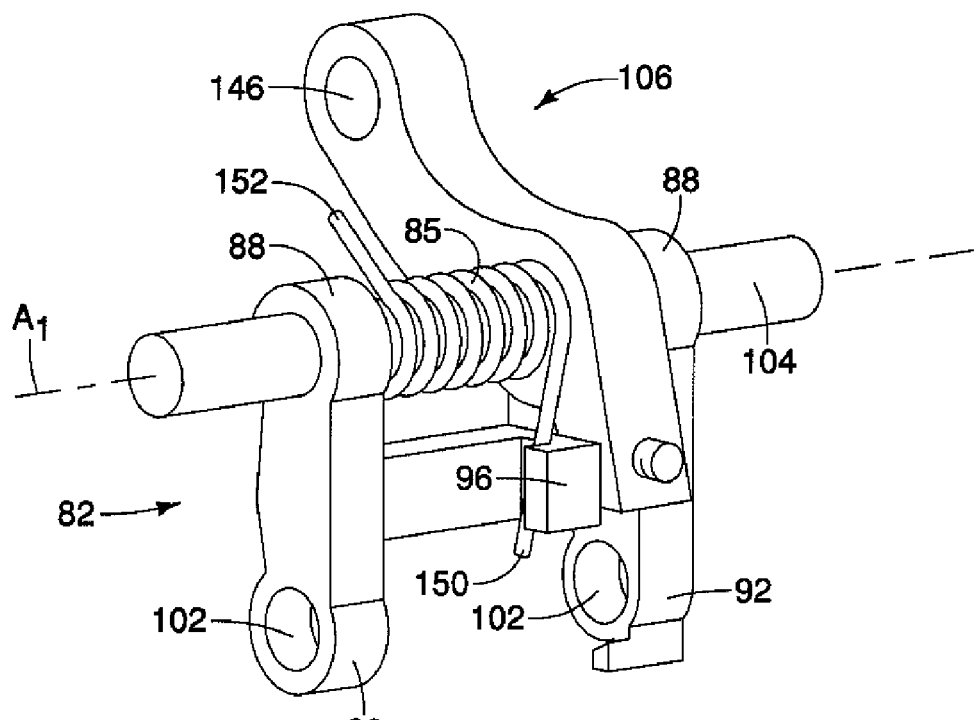
FIG. 16 is a perspective view of the extension arm, the inner link and a biasing member of the linkage assembly of the front derailleur shown removed from the front derailleur in accordance with one embodiment of the present invention.

A description of the extension arm 106 is now provided with specific reference to FIGS. 14, 15 and 16. As best shown in FIG. 14, the extension arm 106 includes a first bore 144, a second bore 146 and a contact portion 148. The first bore 144 is dimensioned to receive the pivot pin 104. More specifically, the pivot pin 104 extends through the first bore 144 such that the extension arm 106 is pivotal about the pivot pin 104 and the first rotational axis $A_1$. The second bore 146 is provided for connection to the lever arrangement 18, as described below. The contact portion 148 is oriented such that one end of the adjustment screw 98 of the inner link 82 contacts the contact portion 148. Hence, a portion of the extension arm 106 extends from proximate the first rotational axis $A_1$ (the first pivot point).

The contact portion 148 cooperates with the adjustment screw 98 of the inner link 82. More specifically, with operation of the adjustment screw 98, the contact portion 148 serves as a position adjustment member operable between the inner link 82 and the extension arm 106.

As mentioned above, the main body 60 includes the ramped recess 72. The ramped recess 72 provides extra clearance or space for movement of the extension arm 106 when the chain guide 44 is in the outer shift position indicated in FIG. 6. With the clearance provided by the ramped recess 72, the position of the extension arm 106 relative to the inner link 82 can be more easily adjusted using the adjusting screw 98.

The biasing spring 85 is basically a coil spring having a first end 150 and a second end 152, as shown in FIG. 16. The biasing spring 85 is retained between the upper projections 88 adjacent to the extension arm 106 about the pivot pin 104. The first end 150 of the biasing spring 85 is confined between the central portion 86 and the spring retaining portion 96 of the inner link 82, as shown in FIG. 16. The second end 152 contacts and is restrained by the lower surface 70 of the fixing member 40, as indicated in FIGS. 3-6. The biasing spring 85 biases the linkage assembly 42 and the chain guide 44 away from the outer shift position shown in FIG. 6 toward the inner shift position shown in FIG. 4.

A description of the lever arrangement 18 is now provided with specific reference to FIGS. 2-6, 17-18 and 22-25. The lever arrangement 18 basically includes a lever member 160, a connecting link 162 and the extension arm 106.

As shown in FIGS. 2-6, the lever member 160 is pivotally supported relative to the fixing member 40 and the bicycle frame 20. Further, the lever member 160 is pivotally supported to the fixing member 40 at a point that is spaced apart from the first and second pivot axis $A_1$ and $A_2$ (the first and second pivot points). The lever member 160 is supported to the fixing member 40 for pivotal movement about the fixed axis $A_3$, the fixed axis $A_3$ extending through the fixing member 40.

As best shown in FIGS. 22-25, the lever member 160 basically includes a pivot portion 170, a connecting link coupling portion 172, a cable attachment portion 174, a cable receiving groove 176 and a movement restricting portion 178.

Figure 23:
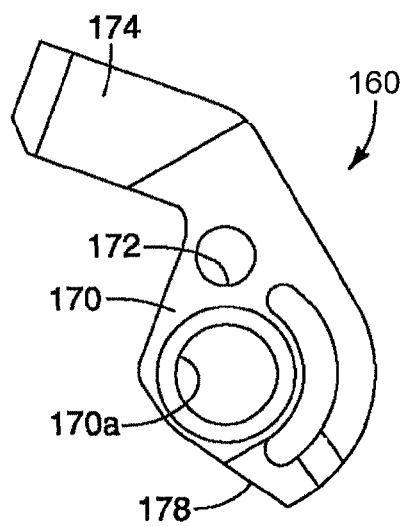
FIG. 23 is a front elevational view of the lever member of the lever arrangement of the front derailleur shown removed from the front derailleur in accordance with one embodiment of the present invention.
Figure 24:
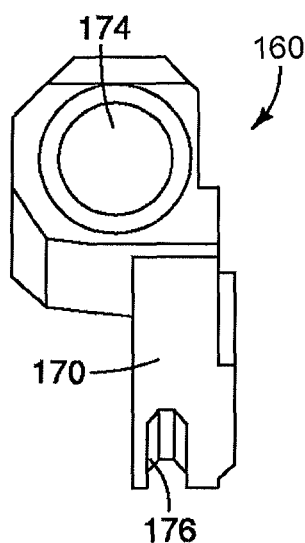
FIG. 24 is a bottom plan view of the lever member of the lever arrangement of the front derailleur shown removed from the front derailleur in accordance with one embodiment of the present invention.
Figure 25:
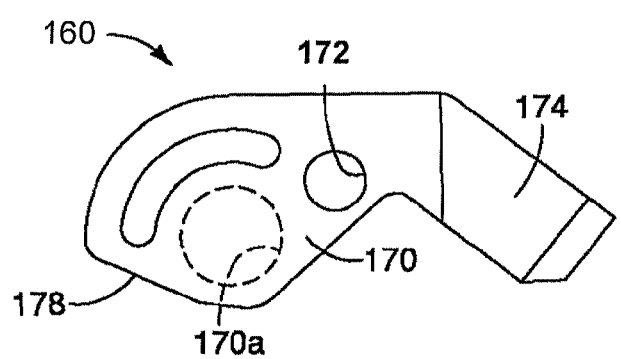
FIG. 25 is an outer side elevational view of the lever member of the lever arrangement of the front derailleur shown removed from the front derailleur in accordance with one embodiment of the present invention.
Figure 26:
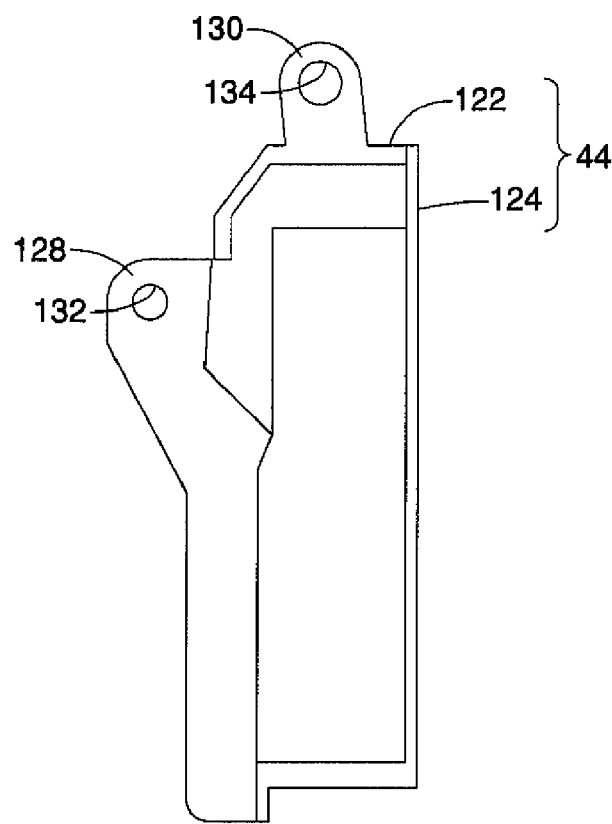
FIG. 26 is an rear elevational view of the chain guide shown removed from the front derailleur in accordance with one embodiment of the present invention.
Figure 27:
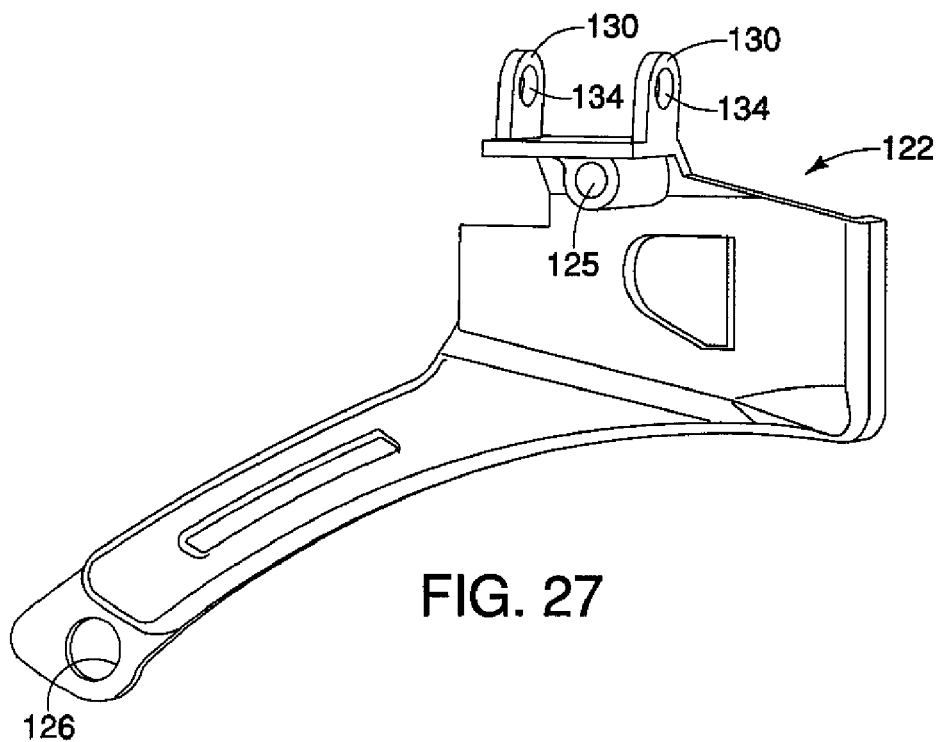
FIG. 27 is a perspective view of a moving part (a first portion) of the chain guide shown removed from the front derailleur in accordance with one embodiment of the present invention.
Figure 28:
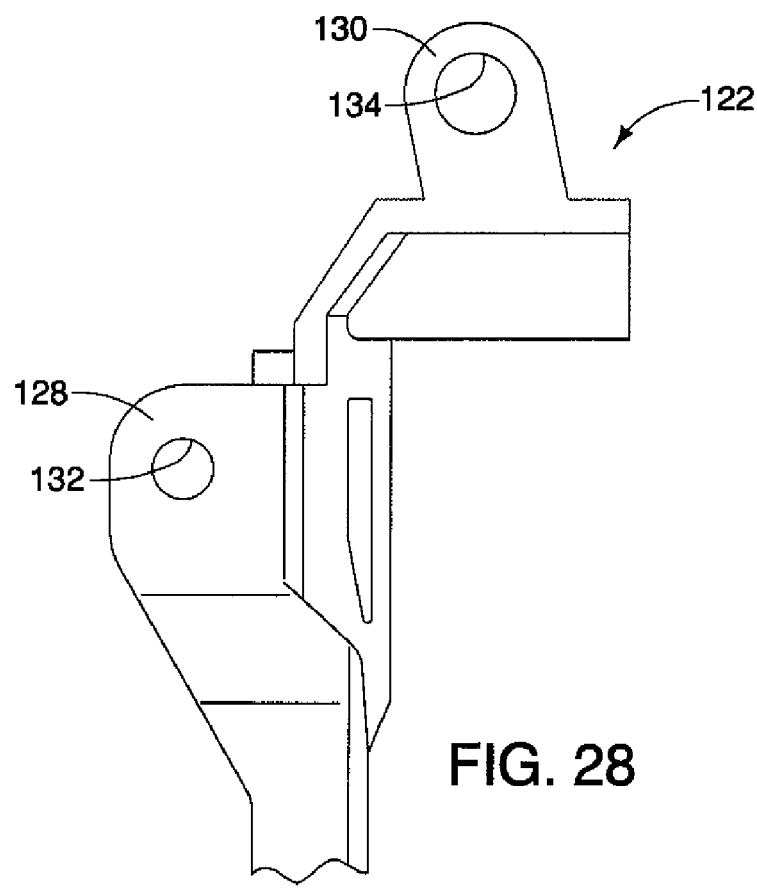
FIG. 28 is a rear elevational view of the moving part (the first portion) of the chain guide, with the view partially cut away, showing the moving part removed from the front derailleur in accordance with one embodiment of the present invention.

As shown in FIG. 23 (and indicated in FIG. 25) the pivot portion 170 of the lever member 160 includes a pivot pin opening 170a. A pivot pin (not shown) extends into the opening 170a and through the bore 80 in the upper portion 68 of the fixing member 40 fixing the lever member 160 to the fixing body 60 for pivotal movement about the fixed rotational axis A3. As indicated in FIGS. 4-6, the lever portion 160 is pivotal about the fixed rotational axis A3 which extends through the fixing member 40.

Figure 2:
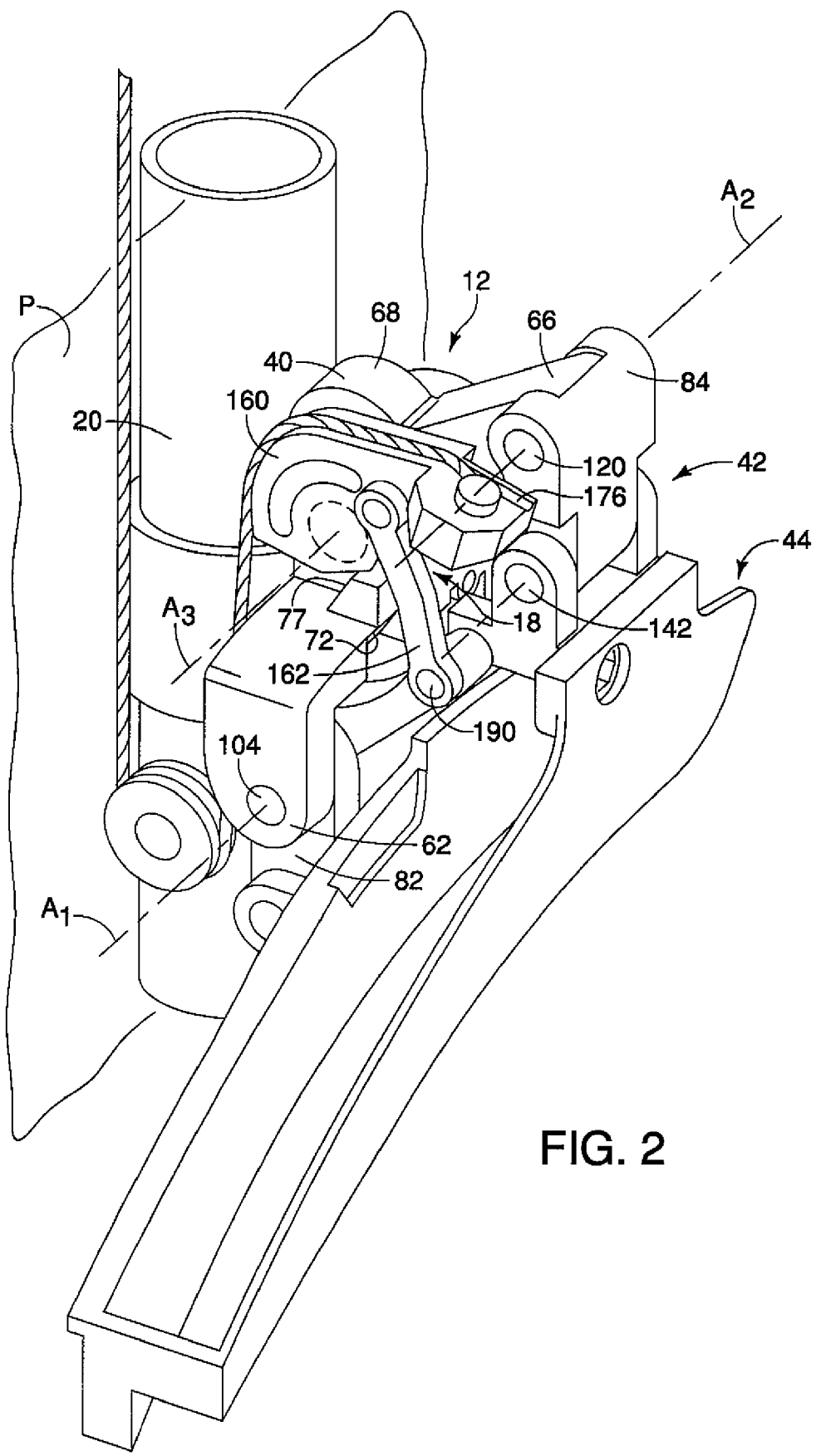
FIG. 2 is a perspective view of a portion of the bicycle showing the front derailleur having a linkage assembly, a chain guide and a lever arrangement in accordance with one embodiment of the present invention.
Figure 3:
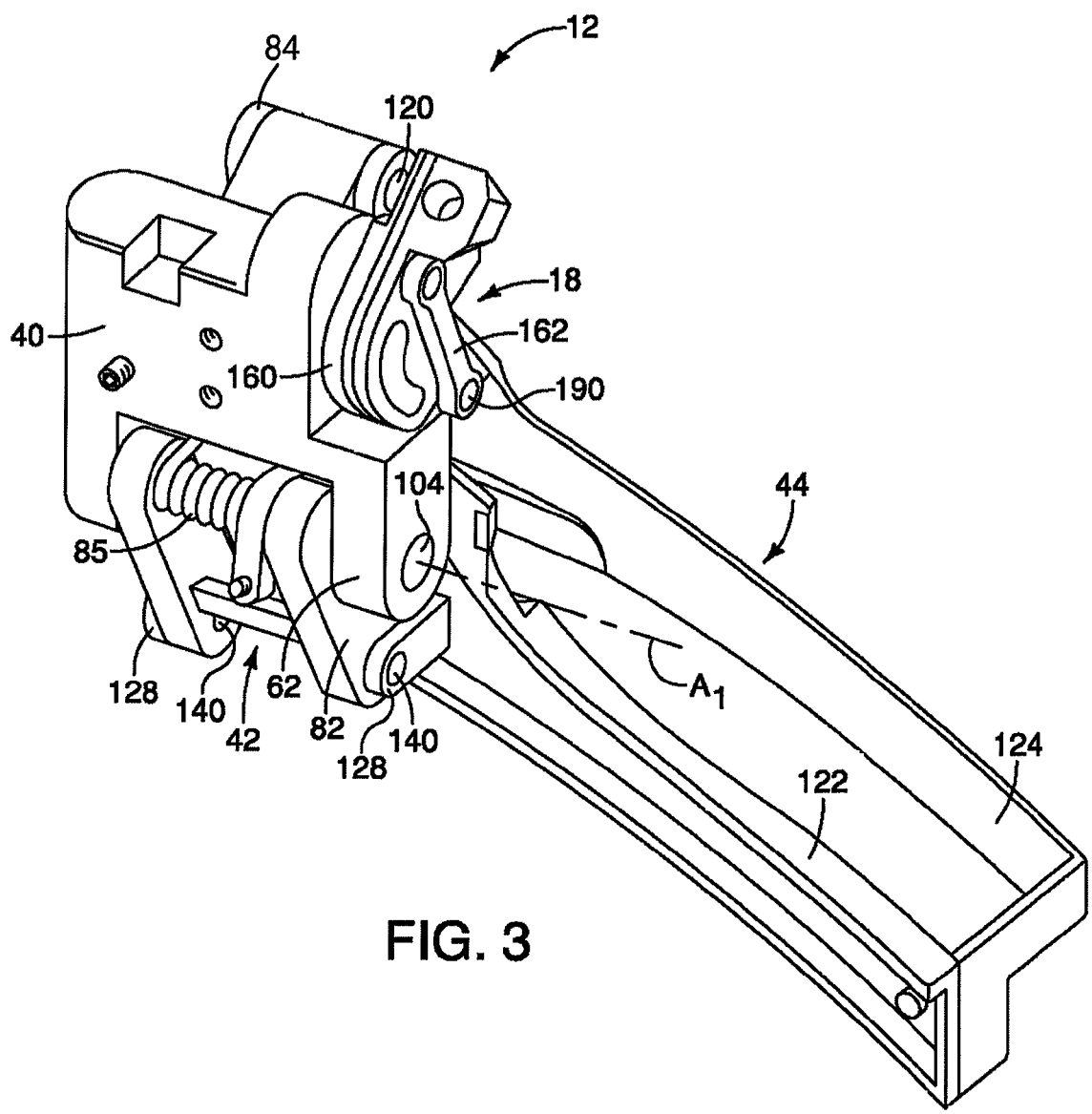
FIG. 3 is a perspective view of the front derailleur shown removed from the bicycle showing aspects of the linkage assembly, the chain guide and the lever arrangement in accordance with one embodiment of the present invention.

The connecting link coupling portion 172 is basically an opening or bore that receives a pivot pin 180 that pivotally connects the connecting link 162 to the lever member 160, as indicated in FIGS. 4-6. The cable attachment portion 174 includes an opening that receives a conventional cable attaching member. The cable receiving groove 176 extends along an outer surface of the lever member 160 to receive portions of the cable 16, as indicated in FIG. 2.

The movement restricting portion 178 basically includes a projection with a contact surface adjacent to the connecting link coupling portion 172 on a portion of the lever member 160 opposite from the cable attachment portion 174 and remote from the pivot portion 170. The movement restricting portion 178 is dimensioned to contact the abutment surface 77 of the fixing member 40 when the chain guide 44 is moved to or close to the outer shift position depicted in FIG. 6.

Figure 17:
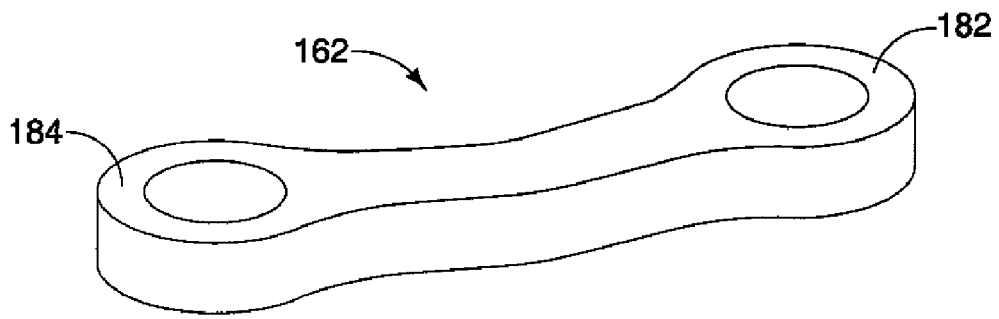
FIG. 17 is a perspective view of a connecting link of the lever arrangement of the front derailleur shown removed from the front derailleur in accordance with one embodiment of the present invention.
Figure 18:
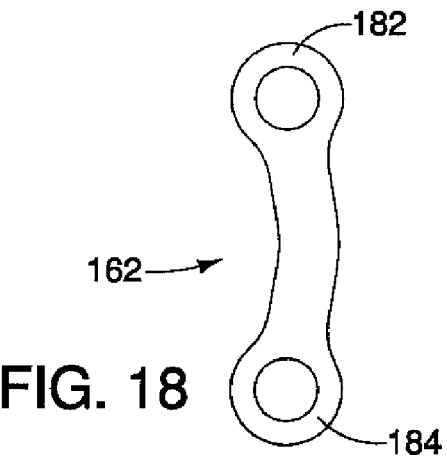
FIG. 18 an rear elevational view of the connecting link of the lever arrangement of the front derailleur shown removed from the front derailleur in accordance with one embodiment of the present invention.

As best shown in FIGS. 17 and 18, the connecting link 162 includes a first end 182 and a second end 184. Both the first and second ends 182 and 184 are provided with bores or openings. As mentioned above, the connecting link 162 operatively connects the lever member 160 to the inner link 82 of the linkage assembly 42 such that the linkage assembly 42 moves in response to movement of the lever member 160. More specifically, the first end 182 of the connecting link 162 is pivotally connected to the connecting link coupling portion 172 of the lever member 160 by the pivot pin 180. Similarly, the second end 184 of the connecting link 162 is pivotally connected to the second bore 146 (a distal end) of the extension arm 106 by a pivot pin 190, as shown in FIGS. 2-6.

When the gear changing mechanism 14 is operated to pull on the cable 16, tension on the cable 16 causes the lever member 160 to pivot about the fixed rotational axis $A_3$ such that chain guide 44 moves from the inner shift position shown in FIG. 4 toward the positions depicted in FIGS. 5 and 6. More specifically, as the lever member 160 pivots about the fixed rotational axis $A_3$, the connecting link 162 pulls on the extension arm 106. The extension arm 106 pushes on the inner link 82 and the chain guide 44 is moved.

The biasing spring 85 continuously applies a biasing force to the inner link 82, urging the inner link 82 and the linkage assembly 42 toward the inner shift position depicted in FIG. 4. When the gear changing mechanism 14 is operated to pull on the cable 16 as described above, the biasing spring 85 is further tightened (coiled) and the biasing force applied by the biasing spring 85 to the inner link 82 increases as the chain guide 44 moves from the inner shift position (FIG. 4) to the outer shift position (FIG. 6). However, the cable 16 is not burdened with a corresponding increase in tension because of the lever arrangement 18.

As shown in FIGS. 4-6, the lever member 160 rotates about the fixed rotational axis $A_3$. Further, the connecting link coupling portion 172 follows an arcuate path about the fixed rotational axis $A_3$ as the lever member 160 moves. Therefore, the first end 182 of the connecting link 162 follows the arcuate path and arcs about the fixed rotational axis $A_3$. As the chain guide 44 is moved toward the outer shift position shown in FIG. 6, a central portion of the connecting link 162 moves closer to the fixed rotational axis $A_3$. As the central portion of the connecting link 162 moves closer to the fixed rotational axis $A_3$, the connecting link 162 approaches an overcenter condition thereby reducing transmitted biasing force from the biasing spring 85.

With the lever arrangement 18 of the present invention, the increasing biasing forces of the biasing spring 85 do not increase the tension applied to the cable 16. With the chain guide 44 in the outer shift position depicted in FIG. 6, the biasing force from the biasing spring 85 is greater than with the chain guide 44 in the inner shift position depicted in FIG. 4. However, with the chain guide 44 in the outer shift position depicted in FIG. 6, the tension felt by the cable 16 from the biasing spring 85 is less than the tension felt by the cable 16 with the chain guide 44 in the inner shift position depicted in FIG. 4. The reduction in transmitted force from the biasing spring 85 to the cable 16 is a direct result of the configuration of the lever arrangement 18. As the connecting link 162 approaches the overcenter condition, less force from the biasing spring 85 is transmitted due to the kinematic relationships between the linkage assembly 42, the connecting link 162 and the lever member 160.

As a result of the configuration of the lever arrangement 18, which includes the lever member 160 and the connecting link 162, tension applied to the cable 16 is reduced. Further, tension transmitted from the cable 16 to the gear changing mechanism 14 is also correspondingly reduced. Consequently, less force is required to operate the gear changing mechanism 14 and the front derailleur 12.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A manually operated bicycle front derailleur assembly comprising:
    a fixing member configured to be mounted to a bicycle frame;
    a linkage assembly supported to the fixing member including an inner link pivotally coupled to the fixing member at a first pivot point, an extension arm extending from proximate the first pivot point having a position adjustment member operable between the inner link and the extension arm, and an outer link pivotally coupled to the fixing member at a second pivot point, the inner link being disposed closer than the outer link to a central longitudinal plane of the bicycle frame with the front derailleur assembly in an installed position;
    a chain guide pivotally coupled to the inner and outer links to move between an inner shift position and an outer shift position;
    a lever member pivotally supported relative to the fixing member and the bicycle frame spaced apart from the first and second pivot points; and
    a connecting link operatively connecting the lever member to a distal end of the extension arm such that the linkage assembly moves in response to movement of the lever member.

2. The manually operated bicycle front derailleur assembly according to claim 1, wherein
    the linkage assembly includes a biasing member coupled to the linkage assembly biasing the chain guide away from the outer shift position toward the inner shift position.

3. The manually operated bicycle front derailleur assembly according to claim 1, wherein
    the lever member includes a cable receiving groove that extends along an outer surface thereof.

4. The manually operated bicycle front derailleur assembly according to claim 1, wherein
    the lever member includes a connecting link coupling portion with the connecting link pivotally coupled thereto.

5. The manually operated bicycle front derailleur assembly according to claim 4, wherein
    the lever member includes a movement restricting portion adjacent to the connecting link coupling portion, the movement restricting projection being dimensioned to contact the fixing member when the chain guide is moved to the outer shift position.

6. The manually operated bicycle front derailleur assembly according to claim 1, wherein
    the lever member includes a movement restricting portion that is dimensioned to contact the fixing member when the chain guide is moved to the outer shift position.

7. The manually operated bicycle front derailleur assembly according to claim 1, wherein
    the lever member pivots about a fixed axis that extends through the fixing member, with the first pivot point located vertically lower than the fixed axis relative to the bicycle frame.

8. The manually operated bicycle front derailleur assembly according to claim 7, wherein
    the lever member includes a pivot portion with the fixed axis extending therethrough and a connecting link coupling portion spaced apart from the fixed axis with the connecting link pivotally coupled thereto.

9. The manually operated bicycle front derailleur assembly according to claim 1, wherein
    the lever member is disposed completely vertically above the inner link, with the front derailleur being in an installed position.

10. The manually operated bicycle front derailleur assembly according to claim 1, wherein
    the connecting link is pivotally mounted on the lever member by a connecting link coupling portion.

11. The manually operated bicycle front derailleur assembly according to claim 10, wherein
    the lever member pivots about a fixed axis that extends through the fixing member, and
    the connecting link coupling portion follows an arcuate path about the fixed axis when the chain guide moves between the inner and outer shift positions.

12. The manually operated bicycle front derailleur assembly according to claim 1, wherein
    the connecting link extends from the lever member to the extension arm.

* * * * *